(12) United States Patent
Kaya et al.

(10) Patent No.: US 7,997,125 B2
(45) Date of Patent: Aug. 16, 2011

(54) MINIATURIZED SPRING ELEMENT AND METHOD FOR PRODUCING THE SPRING ELEMENT

(75) Inventors: Alexander Kaya, Darmstadt (DE); Michael Huth, Eppstein (DE)

(73) Assignees: Nanoscale Systems, Nanoss GmbH, Darmstadt (DE); Johann Wolfgang Goethe-Universitaet, Frankfurt (DE)

( * ) Notice: Subject to any disclaimer, the term of this patent is extended or adjusted under 35 U.S.C. 154(b) by 246 days.

(21) Appl. No.: 12/184,679

(22) Filed: Aug. 1, 2008

(65) Prior Publication Data

US 2009/0025465 A1    Jan. 29, 2009

Related U.S. Application Data

(63) Continuation of application No. PCT/EP2007/000738, filed on Jan. 29, 2007.

(30) Foreign Application Priority Data

Feb. 1, 2006   (DE) .......................... 10 2006 004 922

(51) Int. Cl.
*G01Q 60/40* (2010.01)
*G01Q 70/14* (2010.01)

(52) U.S. Cl. ................ 73/105; 850/41; 850/52; 850/56; 850/59; 850/60; 427/126.1; 427/582; 427/585; 977/890; 977/956

(58) Field of Classification Search ............. 73/105; 850/33, 40, 41, 52, 56, 59, 60; 977/890, 977/956

See application file for complete search history.

(56) References Cited

U.S. PATENT DOCUMENTS

| | | | |
|---|---|---|---|
| 4,812,800 | A | 3/1989 | Fuchs et al. |
| 5,679,888 | A | 10/1997 | Tohda et al. |
| 6,707,308 | B1 | 3/2004 | Michalewicz |
| 7,074,340 | B2 | 7/2006 | Lugstein et al. |
| 2005/0162244 | A1 | 7/2005 | Naito et al. |
| 2008/0162244 | A1 | 7/2008 | Oral et al. |

FOREIGN PATENT DOCUMENTS

| | | |
|---|---|---|
| DE | 3603449 A1 | 8/1987 |
| DE | 60012962 T2 | 8/2005 |
| EP | 0706052 A2 | 4/1996 |
| EP | 0869353 A2 | 10/1998 |
| RU | 2220429 C2 | 12/2003 |
| SU | 907885 A1 | 2/1982 |
| WO | 00/14476 A1 | 3/2000 |
| WO | 01/33226 A1 | 5/2001 |
| WO | 01/94926 A1 | 12/2001 |

OTHER PUBLICATIONS

International Search Report dated May 24, 2007.

*Primary Examiner* — Daniel S Larkin
(74) *Attorney, Agent, or Firm* — Laurence A. Greenberg; Werner H. Stemer; Ralph E. Locher

(57) ABSTRACT

A miniaturized spring element is intended to be particularly suitable for use as a beam probe or cantilever for detecting atomic or molecular forces, in particular in an atomic force microscope, and, to this end, is intended to make it possible to detect its deflection in a particularly reliable manner and with high resolution. For this purpose, the spring element contains a basic body which is formed from a matrix containing embedded nanoparticles or defects. The spring element is produced using the principle of local deposition with focused energetic particles or electromagnetic waves or by pyrolytically induced deposition.

28 Claims, 3 Drawing Sheets

MINIATURIZED SPRING ELEMENT AND METHOD FOR PRODUCING THE SPRING ELEMENT

CROSS-REFERENCE TO RELATED APPLICATION

This is a continuation, under 35 U.S.C. §120, of copending international application No. PCT/EP2007/000738, filed Jan. 29, 2007, which designated the United States; this application also claims the priority, under 35 U.S.C. §119, of German patent application No. DE 10 2006 004 922.5, filed Feb. 1, 2006; the prior applications are herewith incorporated by reference in their entirety.

BACKGROUND OF THE INVENTION

Field of the Invention

The invention relates to a miniaturized spring element containing a flexible basic body. It furthermore relates to a beam probe for an atomic force microscope containing a spring element of this type, and to a method for producing a spring element of this type.

Miniaturized spring elements containing a flexible basic body of microscopic dimensions can be used in a multiplicity of applications. Spring elements of this type usually contain a flexible basic body which is deformed or deflected in reaction to a mechanical force acting externally and assumes its original form again upon cessation of the external force. In this case, the deflection of the basic body may be in particular, proportional to the acting force. In miniaturized form, that is to say with microscopic dimensions of the basic body, spring elements of this type can be used for example, as microbalances for highly precise weighing of individual molecules, as sensor elements in micromechanics, biosensor technology or the like.

A particularly significant and widespread application of miniaturized spring elements of this type is furthermore incorporated as a so-called beam probe or cantilever in an atomic force microscope. An atomic force microscope of this type makes use of the principle that, on account of atomic forces between a fine probe tip and a surface that is to be examined and is situated in direct proximity, interactions between the probe tip and the surface arise which can be used for an evaluation of the atomic structure of the surface. In this case, the probe tip is usually mounted on a flexible carrier or basic body, wherein a corresponding deflection of the flexible basic body is established in a location-dependent manner depending on the atomic-scale contouring of the surface to be examined. Through suitable detection of the deflection or else through the detection of suitably chosen driving signals by which for example the distance between probe tip and surface to be examined is kept constant, an image of the examined surface can thus be created on the atomic scale.

In such applications of miniaturized spring elements it is usually of central importance to be able to measure or detect comparatively accurately the deflection of the respective spring element that is established in a parameter- or situation-dependent manner. In this case, the deflection can be detected for example by light reflection at the top side of the respective spring element or else by utilizing piezo-resistive effects in the flexible basic body. In this case, a highly accurate and particularly reliable detection of the deflection is particularly desirable precisely with regard to the normally atomic dimensions of the samples to be examined.

SUMMARY OF THE INVENTION

It is accordingly an object of the invention to provide a miniaturized spring element and a method for producing the spring element which overcome the above-mentioned disadvantages of the prior art methods and devices of this general type, with which the deflection of the spring element can be detected in a particularly reliable manner and with high accuracy.

With the foregoing and other objects in view there is provided, in accordance with the invention, a method for producing a spring element containing a flexible basic body having a detector zone. An electrical conductivity of which is determined by an electronic tunneling process, an ionization process or a hopping process. The method includes the steps of producing the detector zone by a local energy application process. The local energy application process includes the steps of providing a substrate, feeding in a number of precursor substances in gaseous form to a deposition zone in a vicinity of the substrate, and exciting energetically the precursor substances to effect a transformation resulting in transformation products depositing in solid and non-volatile form on the substrate.

With regard to the spring element, the object is achieved according to the invention by virtue of the flexible basic body having a detector zone, the electrical conductivity of which is determined by electronic tunnelling, ionization or preferably hopping processes.

In this case, the invention is based on the consideration that the deflection of a spring element of the stated type is usually accompanied by a flexure of the flexible basic body which, for its part, correlates in microscopic dimensions with a length change at least of some spatial regions, for example that with regard to the curvature that is established of the inner or outer surface of the basic body. In order to enable a particularly reliable detection of the deflection, therefore, a particularly sensitive detection of even extremely small length changes, in particular in the region of the flexible basic body that is near the surface, should be provided. In order to make this possible, a system which reacts even to extremely small length changes sensitively with a comparatively highly pronounced change in its electrical conductivity is provided in the region of a detector zone of the basic body.

This can be achieved by providing a system in the detector zone in which, by electrically insulated nanoparticles, dopings, defects or traps or by use of structural disorder, localized states or a zero-dimensional electron gas or energy states trapped in some other way are formed for charge carriers. Charge transport can then be effected only in a thermally activated manner when a supporting external electrical, electromagnetic or thermal activation energy is supplied. Possible conduction mechanisms are: so-called hopping mechanism, field emission or ionization effect, Poole-Frenkel effect or a differently configured tunnel effect of the electrons between the localized locations or defects or traps. This is because precisely in the case of such systems in which electron transport is generally based on tunneling, ionization or hopping effects, the electrical conductivity is extremely dependent on the distance between the individual localized states, such that comparatively large effects on the electrical conductivity can be obtained even in the case of extremely small changes in distance, particularly since the electrical variables such as resistance or conductivity in such systems change exponentially with the distance between the tunneling tunneling partners.

In the case of the dominance of hopping processes for the electrical conductivity of the detector zone, which occurs in generally disordered, structureless systems such as amorphous silicon, for example, for this the temperature dependence of its electrical conductivity is preferably given approximately by the relationship $\ln \sigma \sim t^{-\gamma}$. In this case, the detector zone is advantageously configured in such a way that the characteristic exponent $\gamma$ of this relationship has a value of between 0 and 1, preferably approximately the value 0.25, approximately the value 0.5 or approximately the value 1.

In the case of the dominance of simple tunneling processes such as arise owing to the field emission or ionization effect or the Poole-Frenkel effect between locally alternating zones having low and high conductivity and which do not follow the relation $\ln \sigma \sim t^{-\gamma}$, the detector zone has a directly exponentially degenerate sensitivity to positionally varying mechanical stresses since the tunneling current associated with the tunnel effect decreases exponentially with the distance between the tunneling partners. Such locally alternating zones having low and high conductivity are formed for example by composite systems composed of conductive nanocrystallites, defects or traps or dopings embedded in an electrically insulating matrix (base medium). Since the exponential function among all the variants is the most greatly increasing function, the method of deformation detection by the tunnel effect also represents the most sensitive method for measuring positional variations.

In order to ensure the envisaged dominance of the electronic tunneling, ionization or hopping processes for the electrical conductivity of the detector zone, the material forming the latter advantageously has a particularly suitable morphology. In particular, the morphology in the detector zone is in this case preferably chosen in such a way that a multiplicity of zones having a comparatively small extent and having a comparatively high electrical conductivity are formed which are connected to one another via intermediate zones having a comparatively low electrical conductivity or adjoin one another. For this purpose, the material forming the detector zone could have an amorphous, nanocrystalline or polycrystalline structure, for example. Advantageously, however, the detector zone is formed from nanoparticles which are embedded into a matrix composed of suitably chosen, in particular nonconductive, material having a comparatively low electrical conductivity and have a higher electrical conductivity in comparison with the matrix material.

In this case, the nanoparticles can be formed from material having a suitably high electrical conductivity, for example from semiconductor or superconducting material. A setting of desired properties that especially conforms to requirements can be achieved, however, by the nanoparticles advantageously being formed in metallic fashion, in particular from gold (Au) or platinum (PI).

Preferably, inorganic, organic or dielectric material or else polymer material is provided for forming the matrix.

With regard to the choice of its respective parameters, the material which forms the detector zone and which is provided as sensor-active material is advantageously configured especially with regard to the desired great dependence of the electrical conductivity on a deformation or length change. In order to ensure this, in particular the nanoparticles or the defects that bring about the localized states are chosen suitably with regard to their size, distances, constitution and particle number density in the case of embedding into the matrix in such a way that the resulting electrical conductivity is essentially dominated by the electronic tunnel, ionization or hopping processes mentioned. In this case, the nanoparticles have for example an average particle size of up to 10 nm. As an alternative, however, particles sizes of up to 100 nm or more are also conceivable provided that they are sufficiently insulated from one another electrically and their distances are small enough such that tunnel effects can be established between them.

In one advantageous development, the detector zone is formed by a coating applied to a carrier body. With regard to the other properties of the miniaturized spring element such as, for example, quality, deformability or other elastic properties, it is possible to have recourse here to existing spring elements that have already proved to be worthwhile in use, wherein a silicon substrate can be provided particularly in the case of a use as a beam probe in an atomic force microscope. In the manner of a refinement of a customary spring element or cantilever of this type, the detector zone of the basic body can be formed in this case by applying a coating of the type mentioned. As an alternative, however, the basic body as a whole and hence in its entirety can also form the detector zone.

The spring element, and in particular the basic body that forms it, is preferably adapted with regard to its dimensioning and shaping in particular to the envisaged purpose of use. By way of example, the basic body can in this case be configured in a membrane-like fashion, which would enable in particular a use in pressure sensors or the like. Advantageously, however, the basic body can also be configured in the manner of a rod extended in a longitudinal direction, wherein a defined measurement geometry is valid by the stipulation of such a longitudinal extension. In this case, the basic body advantageously has a substantially prism-shaped cross section.

The spring element is suitable for a great multiplicity of applications, for example as highly compact and sensitive gas sensors or biosensors in the field of molecular chemistry or life sciences, such as in gas concentration measurement or DNA analysis, for example. In medicine, it is conceivable to use multidimensional arrays of such spring elements for example for the diagnosis of diseases by the analysis of metabolic products of exhaled air by direct weighing and characterizing of the molecules. A blood analysis with the aid of extremely small miniaturized spring elements can generally also be used for myocardial infarction diagnosis or for detecting tumor markers. In the field of microbiology, spring elements of this type can be used, on account of the deflection sensor technology integrated via the detector zone, for the detection of microorganisms and the investigation of antibiotic resistances such as are occurring increasingly more frequently in the context of combating bacterial diseases using medicaments. Moreover, spring elements of this type can be used in the area of environmental protection for the detection of toxic constituents in the air, in gases and in liquids or in the detection of poisonous or explosive substances in the chemical industry.

In a particularly advantageous development, however, the spring element is used as a cantilever in an atomic force microscope, wherein the cantilever is provided with a probe or sensing tip in a suitable manner in order to form the so-called beam probe of the atomic force microscope. This is because it is precisely in this application that the extremely sensitive and high-resolution deflection sensor technology is manifested particularly advantageously and enables the particularly high measurement sensitivity required in atomic force microscopy.

In this case, the atomic force microscope is configured in a manner customary per se for lateral sensing of the topography of a measurement object. In order that the highly sensitive change in the conductivity of the detector zone depending on the deflection of the spring element can be utilized particularly expediently in this case, the atomic force microscope is advantageously provided with an evaluation unit, which generates a data record that is characteristic of the topography of the test object on the basis of driving or measurement data of the beam probe, wherein the evaluation unit takes account of characteristic values that are characteristic of the conductivity of the detector zone of the cantilever when generating the data record. In this case, the topography could be evaluated for example in the manner of a surface relief. In the evaluation of a magnetized sample with a magnetic sensing tip, a "magnetic topography" could also be evaluated. As an alternative or in addition, a lateral movement of the cantilever over the surface could also be provided, in the case of which torsion of the cantilever occurs owing to friction with the sample surface (so-called "friction mode").

During operation of the atomic force microscope, the deflection of the beam probe is advantageously determined on the basis of a measurement value which is characteristic of the electrical conductivity of the detector zone of the beam probe. For this purpose, the detector zone of the spring element is preferably suitably contact-connected and connected to the evaluation unit of the atomic force microscope.

In principle, various technologies are conceivable for producing the spring element. A method which can be adapted particularly well to the design principles of the spring element, in particular to the provision of the detector zone, and is therefore particularly suitable for production and by which the object in this regard is achieved according to the invention is, however, a deposition by local energy excitation such as, for example, an ion beam induced, pyrolytically induced or photon beam induced deposition, particularly advantageously electron beam induced deposition (EBID). These methods are based on the physical and chemical transformation processes of a precursor gas present at the beam location which take place under a scanned particle beam containing electrons, ions or photons or a beam of electromagnetic waves. This method enables a targeted material deposition of functional nanostructures in particular in the sense of deposit structuring on a microscopic scale, wherein a targeted spatial construction of the desired structures limited to the spatial composition desired in the end product is possible through the choice of suitable deposition parameters.

Therefore a subsequent after treatment of structures once they have been deposited in the sense of conventional methods, such as, for example, by lithographic etching or the like, is not necessary in order to produce the desired spatial form for the miniaturized end product. In this case, the deposit structuring process is based on the principle that molecules of a starting structural substance (precursor) which are in the gas phase and adsorbed on a surface within a vacuum environment are excited by a locally concentrated energy irradiation, which can contain for example focussed electrons, ions or photons or other energetically concentrated objects, and are fixed by a decomposition or transformation process of their bonds as a sediment or deposit permanently on a surface of a substrate situated in the vicinity. In this case, the initial material deposition simultaneously serves as a seed point for new depositions which are guided by the local position of the energy action and the residence duration thereof, such that any desired three-dimensional objects can be deposited on the support, depending on the focusability of the energy source with up to nanometer precision accuracy.

Through the suitable choice of the starting substances or precursor materials and also through the suitable choice of the parameters used during the deposition process, the microscopic properties of the end product can be influenced in this case in a particularly flexible and far-reaching manner. In order to ensure, in the detector zone, the desired great dependence of the electrical conductivity on a possible length change and the targeted and comparatively homogeneous distribution—provided for this—of nanoparticles in a suitable matrix, precursor materials used in this case are advantageously organic, inorganic, dielectric or organometallic complexes, monomers, oligomers, polymers, or mixtures of the monomers, oligomers and polymers, which are preferably in the gas phase and have a vapor pressure that is particularly expedient for the deposition. The precursor substance used is advantageously in particular $CH_3$, $C_5O_2H_7$, $C_5O_2F_3H_4$, $C_5O_2F_6H$, $C_5H_5$, $Me_2Au(acac)$ [empirical formula: $(CH_3)_2AuC_5O_2H_7$], $Me_2Au(tfac)$ [empirical formula: $(CH_3)_2AuC_5O_2F_4$], $Me_2Au(hfac)$ [empirical formula: $(CH_3)_2AuC_5O_2F_6H$], $Cu(hfac)_2$ [empirical formula: $Cu(C_5O_2F_6H)_2$], $CpPtMe_3$ [empirical formula: $C_5H_5Pt(CH_3)_3$], $CpMePtMe_3$ [empirical formula: $C_5H_4(CH_3)Pt(CH_3)_3$], $MO(CO)_6$, $W(CO)_6$, $WF_6$, $[RhCl(PF_3)_2]_2$, $Co_2(CO)_8$, $AuCl(PF_3)$ and/or $Ni(CO)_4$.

The deposition method mentioned is suitable in particular both for the production of a surface coating for producing the detector zone on a substrate serving as a carrier body in the manner of a subsequent refinement of the carrier body and for the production of a bulk body, in which the basic body of the spring element per se is already formed from the nanoparticles embedded into the matrix and thus for its part forms in its entirety the detector zone. In order to produce structures of this type, an energetic particle beam provided for the energetic excitation of the precursor substances or a local pyrolytic treatment, for example by a laser beam, is advantageously guided, with respect to the substrate, laterally or three-dimensionally depending on a predetermined desired geometry of the deposit.

Advantageously, the temperature of the substrate is in this case regulated in a suitable manner during the deposition. The speed of the surface diffusion processes on the substrate is thereby influenced, which leads to a regulable subsequent delivery rate of precursor material and thus to a controlled growth rate of the deposit. As an alternative, the subsequent delivery rate can also be regulated by either increasing or decreasing the temperature of the precursor source since this directly influences the vapor pressure of the precursor.

As an alternative, the pyrolytic or pyrolytically induced deposition can advantageously be used as well. In this case, solid deposits can also be deposited on a substrate by heating the substrate after a nondirectional adsorption of precursor molecules, for example from below by a heating wire or from above by a laser beam. The supply of energy then locally effects the desired transformation of the precursor materials. It is thus possible to obtain a deposit which, although it is only comparatively coarsely structured laterally, may nevertheless be particularly suitable for example for a subsequent refinement of cantilevers based on silicon. Furthermore, such a pyrolytic deposition could serve for the production of membranes for pressure measurement, in the case of which a lateral fine structuring would be only of secondary importance.

Through the application of the deposit structuring mentioned, in particular through the production of the detector zone or else of the entire basic body of the spring element by electron beam induced deposition or else by ion beam induced, pyrolytically induced or photon beam induced deposition, it is possible to achieve a particularly high flexibility in the setting of desired properties of the end product. In particular, through the choice of a suitable structure, for the matrix, it is not just possible to set the electrical conductivity in a suitable manner in the sense of the desired sensitivity in the case of a length change, rather a targeted influencing of the production parameters during the deposition of the structures also makes it possible to influence other microscopic properties in a targeted manner. In particular, in this case the mechanical properties of the basic body and thus of the entire spring element can be influenced in a suitable manner depending on the predetermined purpose of use, wherein in particular an elasticity that is particularly expedient for the intended application or a particularly expedient quality of the spring element can be set.

By way of example, using precursors composed of organometallic complex compounds, it is possible to deposit particularly readily flexible, soft structures, in particular electrically conductive matter structures having a nanocrystalline character for use in tunnel electronics. By contrast, precursors having a high proportion of carbon, such as volatile residual gas oil molecules, for example, form as deposit, on account of the covalent carbon bonds acting in the agglomerate, mechanically particularly "hard", diamond-like deposits which are particularly rigid as spring elements. This is particularly advantageously taken into account in the production of the spring element in that a number of the parameters, type, quantity and/or composition of the precursor substances, gas pressure in the deposition zone, intensity of the local energy application (e.g. electron beam), radiation duration of the electron beam, focus size of the electron beam, substrate material and/or substrate temperature are set in such a way that the spring element has a predetermined spring constant and/or a predetermined quality.

Through a suitable choice of the deposition parameters, it is also possible to produce spring elements which are distinguished by a higher robustness and longevity or freedom from fatigue under mechanical loading in comparison with semiconductor-based spring elements composed of single crystals or polycrystals (for example Si cantilevers). The deposition parameters can be chosen for example in such a way that the spring element is predominantly composed of a matrix with dominantly covalent bond portions; for example between carbon atoms in the form of a diamond-like bond (tetrahedral coordination). Very hard spring elements can also be produced when the diamond-like bonds are formed only locally (amorphous structure). No or only very little dislocation formation occurs in a large amorphous structure owing to the lack of an ordered atomic lattice structure. The structure thus becomes free of fatigue since an important designation process is dislocation slip. Therefore, composite structures of this type are generally very well suited to hard material applications, for example for hard material coating.

In this connection it can also be taken into account that the positionability—freely selectable with nanometer precision—of the deposit spring structures on the substrate during deposition additionally permits the construction of comparatively complex, functionally interrelated multiple spring systems, such that the production of the spring device arrays (so-called spring or cantilever arrays) is made possible in a particularly simple manner. Moreover, a further adaptability to application-relevant aims is also provided by virtue of the fact that a comparatively high flexibility with regard to geometrical aspects is afforded in the deposit structuring provided. In particular, the lateral resolution and the aspect ratio (or the height-width ratio) and also further elastomechanical, electrical and magnetic properties of the deposit depend comparatively sensitively on the type of energy source chosen, the intensity thereof and the duration of action thereof, and also the comparatively complex interplay—relevant to the transformation processes during the deposition of the deposit on the substrate—of precursor material used, the quantity thereof, and the other ambient factors such as, for example, temperature, substrate material and quality of the process vacuum. By influencing these parameters, a targeted setting of different properties of the deposit produced is thus possible.

The advantages afforded by the invention consist, in particular, in the fact that providing a detector zone on the basis of nanoparticles embedded into a matrix makes it possible to achieve a particularly sensitive dependence of the electrical conductivity of the detector zone on length changes on an extremely small scale. Therefore it is possible to carry out particularly sensitive measurements which are associated with tiny length changes, such as for example which lead to a local contraction or extension of the regions of the spring element that are near the surface. The deflection of the spring element can thus be measured particularly precisely, such that it is possible to provide highly accurate sensors on the basis of such deflection measurements. For applications in which comparatively large deflections are also to be detected, the spring element can additionally be provided with a mirror-coated area that enables an optical detection of deflections.

Sensors of this type can be used for example in micromechanics, biosensor technology or the like. The production of the detector zone or else of the entire spring element by deposit structuring methods such as, in particular, electron beam induced deposition additionally enables the targeted production of microscopic structures having a high range of desired properties, wherein in addition to the electrical properties the mechanical properties can also be set particularly expediently in particular through suitable material and parameter choices. In particular, this flexibility affords the possibility of prior setting of spring characteristics and qualities of the elements which particularly enhance the latter in particular for use in atomic force microscopy. Moreover, the use of electron beam induced deposition makes it possible to produce extremely miniaturized spring elements or cantilevers, wherein in particular the spring and detection geometry is virtually freely selectable. In this case, the miniaturization of micromechanical systems can be advanced significantly further by comparison with customary systems; in this case it is possible to achieve length dimensions reduced by the factor of 1000 for example in comparison with systems produced by conventional structuring methods.

Other features which are considered as characteristic for the invention are set forth in the appended claims.

Although the invention is illustrated and described herein as embodied in a miniaturized spring element and a method for producing the spring element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
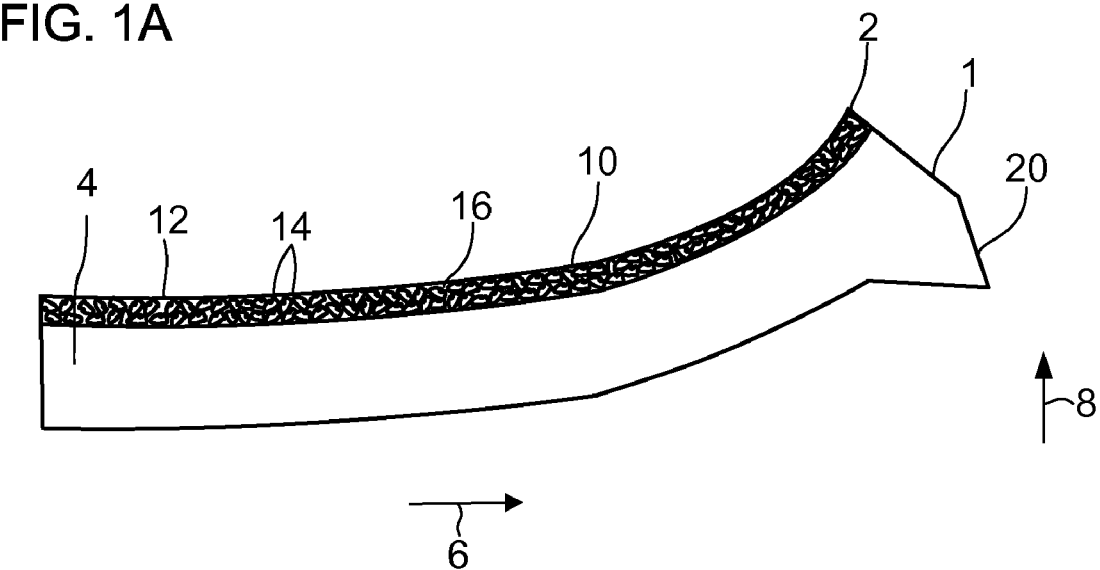
FIGS. 1A and 1B are diagrammatic illustrations of a miniaturized spring element.
Figure 1B:
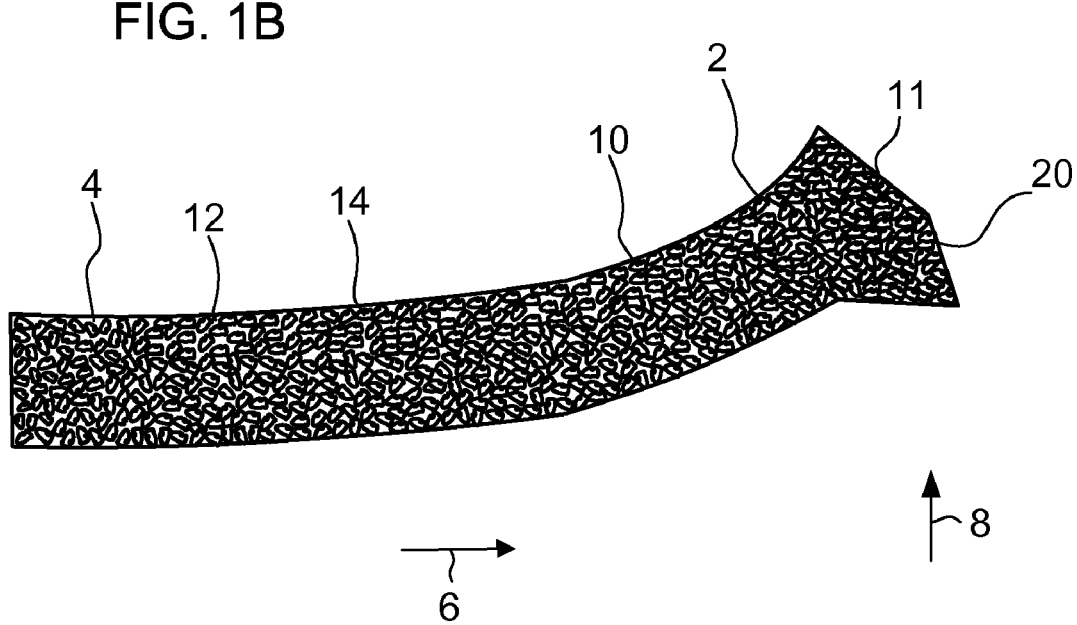

Identical parts are provided with the same reference symbols in all of the figures. Referring now to the figures of the drawing in detail and first, particularly, to FIGS. 1A and 1B thereof, there is shown a miniaturized spring element 1, 1' respectively in particular for use as a cantilever 2 or as a beam probe in an atomic force microscope. As an alternative, however, a multiplicity of further application possibilities in microsensor technology or biosensor technology or the like are also conceivable. The miniaturized spring element 1, 1' contains a flexible basic body 4, which is configured in the manner of a rod extended in a longitudinal direction indicated by arrow 6 and has a substantially prism-shaped cross section. In this case, with regard to its elastic properties and the like, the basic body 4 is configured to be deflected in a deflection direction, which is indicated by arrow 8 and is substantially perpendicular to a longitudinal direction, by a mechanical force present externally, this resulting in a corresponding flexure of the basic body 4. FIGS. 1A, 1B show the respective basic body 4 in a position deflected in this way. Upon cessation of the externally acting mechanical force, the basic body 4, and with it the entire spring element 1, 1', returns to a rest position oriented in a substantially rectilinear fashion. If the spring element 1, 1' is extended in its contour perpendicular to the intermediate plane, this results in a thin membrane for detecting areally acting forces, for example for measuring the thermodynamic gas pressure.

The spring element 1, 1' is configured to precisely detect the deflection upon the action of a mechanical force in a particularly sensitive and high-resolution manner. For this purpose, the basic body 4 of the spring element 1, 1' in each case contains a detector zone 10 formed by preferably metallic nanoparticles 14 embedded in a matrix 12. In the exemplary embodiment, the matrix 12 is in this case configured as a polymer matrix into which the metallic nanoparticles 14 are embedded. In this case, the nanoparticles 14 form embedded localized states for electrical charges. These can alternatively or additionally also be formed by defects or traps or by structural disorder, for example in an amorphous medium.

With regard to a choice of the material of the matrix 12 and nanoparticles 14 and also with regard to the average particle size of, in the exemplary embodiment, approximately 10 nm and the density of the nanoparticles 14, the corresponding parameters are chosen in such a way that the electrical transport between the nanoparticles 14 within the matrix 12 is characterized by hopping processes and is guided via tunneling processes. The conduction mechanism in the detector zone 10 is therefore effected by the thermally activated hopping mechanism (hopping, nearest neighbor hopping, variable range hopping) between localized locations and arises as a result of a quantum mechanical tunnel effect. Complying with this boundary condition ensures that the electrical conductivity of the detector zone 10 depends very greatly and sensitively even on extremely small length or distance changes, such that the latter can be detected with high sensitivity and resolution. As can be gathered from the illustrations in FIGS. 1A and 1B, a deflection of the basic body 4 in the deflection direction at least locally and in proximity to the surface of the basic body 4 results in at least slight length changes in the longitudinal direction, such that deflections of this type can also be measured with high sensitivity via the change in the electrical conductivity of the detector zone 10.

In this case, the spring element 1 in accordance with FIG. 1A is constructed with recourse to a spring element of a conventional configuration on a silicon basis which serves as a carrier body 16 and is provided with a superficial coating in order to form the detector zone 10. The configuration of the spring element 1 according to FIG. 1A thus corresponds to a refinement of a conventional spring element in which the detector zone 10 provided for the high measurement resolution desired is applied by subsequent coating.

In contrast to this, the spring element 1' in accordance with FIG. 1B is constructed in the manner of a basic body 4 which is produced completely newly in the bulk or three-dimensionally and which is already formed per se by the metallic nanoparticles 14 embedded into the matrix 12 and for its part thus forms in its entirety the detector zone 10. Precisely in this exemplary embodiment, therefore, through suitable parameter choices not only the electrical properties, in particular the conduction properties, of the detector zone 10 but also the mechanical properties of the entire basic body 4 can be set in a suitable manner. In particular, in this exemplary embodiment the mechanical properties of the matrix 12 dominate the elastic properties (modulus of elasticity) and the mechanical quality of the basic body 4 overall. Through suitable choice of the material used for forming the matrix 12 and as a result of the nanoparticulate structure of the metal portion, dislocation formation is largely suppressed in the production of the basic body 4, such that the achievable quality and mechanical stressability and freedom from fatigue of the spring element 1' and hence the robustness and longevity thereof under mechanical loading are particularly high.

Figure 2:
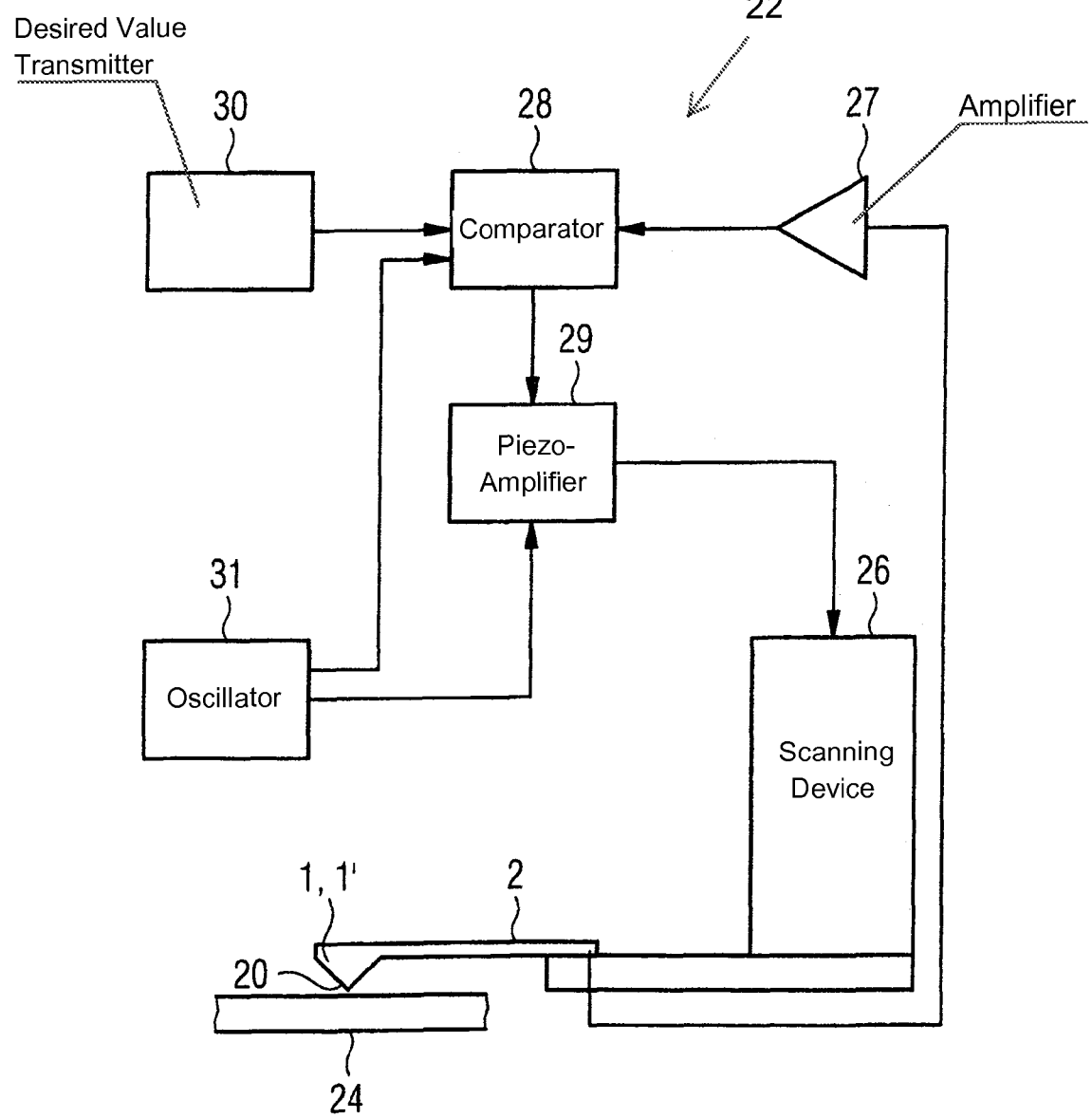
FIG. 2 is a block diagram of an atomic force microscope.

The spring elements 1, 1' are especially embodied for use in an atomic force microscope. For this purpose, a probe tip 20 is integrally formed in each case on the basic body 4 and enables the measurement object to be scanned. The construction of a corresponding atomic force microscope 22 is shown schematically in FIG. 2. The atomic force microscope 22 contains a cantilever 2, also referred to as a beam probe, which is embodied as spring element 1, 1'. In this case, the probe tip 20 can be guided along the surface of a measurement object 24. In this case, the probe tip 20 is guided over the surface of the measurement object 24 by a piezoelectric scanning device 26. Deflections of the cantilever 2 are ascertained in this case by changes in the electrical conductivity of the spring element 1, 1' that forms the cantilever 2 being determined by a suitable electrical contact-connection of the detector zones 10 respectively provided.

A scanning device (piezo-transducer), 26 is driven by a piezo-amplifier 29. The output voltage thereof is predetermined by a comparator 28, which compares the measurement signal (actual value), which comes from the deflection sensor of the cantilever 2 and is amplified in the amplifier 27 with a desired value from the desired value transmitter 30. An output voltage of the comparator changes until the difference between the desired value and the actual value disappears. The height of the cantilever above the measurement object, or the pressure force of the cantilever during measurements in the "contact mode", is thus kept constant during lateral scanning. An atomic force microscope image is determined from the output voltage of the comparator 28 in the conventional manner.

For measurements with a vibrating cantilever with a periodically established minimum distance from the surface of the measurement object, an oscillator 31 is provided. The oscillator signal is fed to the comparator in this case. The measurements of the cantilever deflection then require a phase-sensitive rectifier as part of the amplifier 27.

The detector zone 10 of the spring element 1, 1' and possibly also the entire basic body 4 are produced by so-called deposit structuring, wherein particulate growth of the respective structures is produced in those spatial regions, and also restricted thereto, in which the desired structures are envisaged to arise. The subsequent, for example lithographic, etching necessary in the case of other miniaturized structures is thus obviated. In order to produce the respective structures, the method of so-called electron beam induced or ion beam induced deposition is provided in the exemplary embodiment. Individual formation phases of the corresponding structures are in this case illustrated in FIGS. 3A to 3C.

Figure 3A:
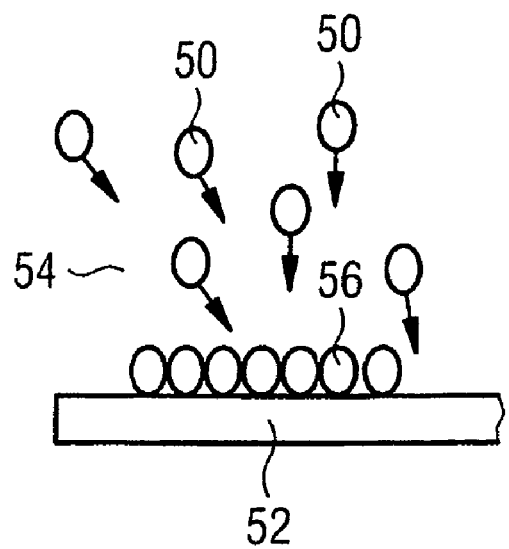
FIGS. 3A-3C are illustrations showing a deposit growing onto a substrate in different deposition phases.

As can be gathered from the schematic illustration in FIG. 3A, in a suitable environment, in particular in a vacuum, precursor substances, such as are illustrated on the basis of particles 50 in FIG. 3A, are brought in gaseous form into the vicinity of a substrate 52. An adsorption of precursor material takes place on the substrate 52 as a result of adhesion forces between the precursor molecules 50 and the substrate 52.

Figure 3B:
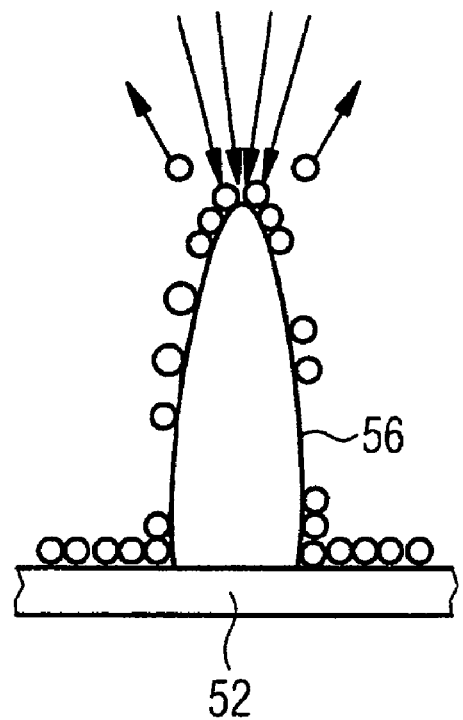
Figure 3C:
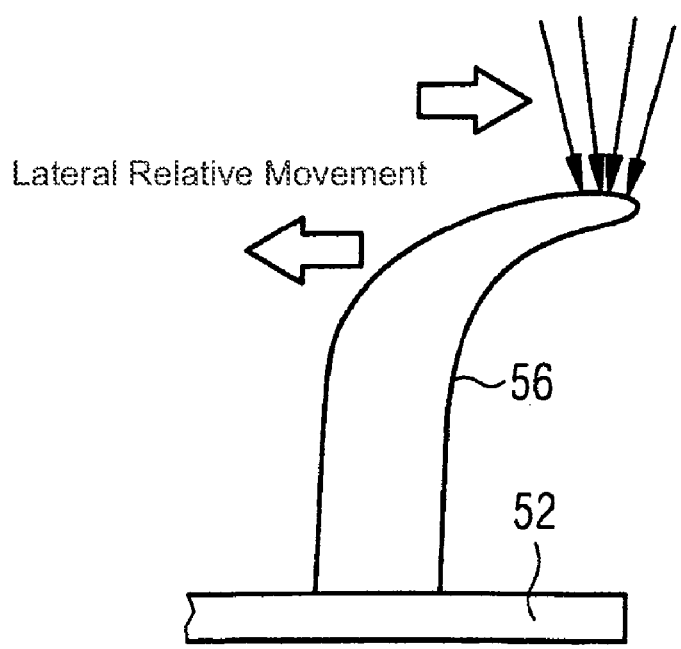

The precursor substances are energetically excited to effect a transformation in a deposition zone 54 in direct proximity to the substrate 52, wherein the transformation products deposit in solid and non-volatile form as a sediment or deposit 56 permanently on the substrate 52. In this case, the initial material deposition on the substrate 52 simultaneously serves as a seed location for new depositions which are guided by the local position of the energy action and the residence duration thereof, such that virtually any desired three-dimensional objects can be produced on the substrate 52. As shown in FIG. 3B, the targeted deposition of the deposit 56 in various geometries is possible by suitable spatial variation of the focus of the electron beam or ion beam, wherein—as shown in FIG. 3C—curved structures can also be produced in the deposit 56 by a lateral relative movement.

The invention claimed is:

1. A method for producing a spring element containing a flexible basic body having a detector zone with an electrical conductivity determined by a process selected from the group consisting of an electronic tunneling process, an ionization process and a hopping process, which method comprises the steps of:
    producing the detector zone by a local energy application process, including the steps of:
        providing a substrate;
        feeding in a number of precursor substances in gaseous form to a deposition zone in a vicinity of the substrate;
        selecting the precursor substances from the group consisting of organic monomers, inorganic monomers, dielectric monomers, organometallic monomers, oligomers and polymers; and
    exciting energetically the precursor substances to effect a transformation resulting in transformation products depositing in a solid and non-volatile form on the substrate.

2. The method according to claim 1, which further comprises producing the flexible basic body by a local energy application process.

3. The method according to claim 1, which further comprises producing at least one of the detector zone and the flexible basic body by an electron beam induced deposition process.

4. The method according to claim 1, which further comprises:
    using a beam selected from the group consisting of an ion beam, a photon beam and an electron beam for an energetic excitation of the precursor substances; and
    guiding the beam with respect to the substrate one of laterally and three-dimensionally depending on a predetermined desired geometry of the transformation products forming a deposit.

5. The method according to claim 1, which further comprises regulating a temperature selected from the group consisting of a temperature of the substrate and a temperature of a precursor source during the method in dependence on a vapor pressure of the precursor substances that is determined in the deposition zone.

6. The method according to claim 1, which further comprises setting an item selected from the group consisting of a number of parameters type, a quantity of the precursor substances, a composition of the precursor substances, a gas pressure in the deposition zone, an intensity of the local energy application, a radiation duration of the local energy application, a focus size, a substrate material and a substrate temperature such that the spring element has at least one of a predetermined spring constant and a predetermined quality and the detector zone has a predetermined electrical conductivity.

7. A miniaturized spring element, comprising:
    a flexible basic body having a detector zone, said detector zone having an electrical conductivity determined by a process selected from the group consisting of an electronic tunneling process, an ionization process and a hopping process, said detector zone being produced by a local energy application process, wherein:
        a substrate is provided;
        a number of precursor substances are fed in gaseous form to a deposition zone in a vicinity of said substrate;
        said precursor substances are selected from the group consisting of organic monomers, inorganic monomers, dielectric monomers, organometallic monomers, oligomers and polymers; and
    said precursor substances are excited energetically to effect a transformation resulting in transformation products depositing in solid and non-volatile form on said substrate.

8. The spring element according to claim 7, wherein a temperature dependence of said electrical conductivity $\sigma(T)$ of said detector zone is given approximately by the relationship $\ln\sigma \sim T^{\gamma}$, where a characteristic exponent $\gamma$ has a value of between 0 and 1.

9. The spring element according to claim 8, wherein said flexible basic body forms said detector zone.

10. The spring element according to claim 8, wherein said value of said characteristic exponent $\gamma$ is approximately 0.25.

11. The spring element according to claim 8, wherein said value of said characteristic exponent $\gamma$ is approximately 0.5.

12. The spring element according to claim 8, wherein said value of said characteristic exponent $\gamma$ is approximately 1.

13. The spring element according to claim 7, wherein said detector zone contains a matrix material embedded with nanoparticles having a higher electrical conductivity in comparison with said matrix material.

14. The spring element according to claim 13, wherein said nanoparticles are metallic nanoparticles.

15. The spring element according to claim 14, wherein said metallic nanoparticles are formed from chemically stable materials.

16. The spring element according to claim 15, wherein said chemically stable materials are selected from the group consisting of gold and platinum.

17. The spring element according to claim 13, wherein said matrix material includes a material selected from the group consisting of a polymer material, organic structure elements, inorganic structure elements, carbon-based compounds, carbon-oxygen compounds, hydrogen compounds, fluorine compounds and metal-containing structure elements.

18. The spring element according to claim 13, wherein said matrix material is formed from a material selected from the group consisting of an organic material, an inorganic material and a dielectric material.

19. The spring element according to claim 13, wherein said nanoparticles have an average particle size of up to 100 nm.

20. The spring element according to claim 19, wherein said nanoparticles have an average particle size of up to 10 nm.

21. The spring element according to claim 7, wherein said detector zone further contains a carrier body and a coating applied to said carrier body.

22. The spring element according to claim 7, wherein said flexible basic body is selected from the group consisting of a thin membrane and a rod extended in a longitudinal direction.

23. The spring element according to claim 22, wherein said flexible basic body has a substantially prism-shaped cross section.

24. A method of using the spring element according to claim 7, which comprises the step of:
   using the spring element as a sensor element for detecting at least one of length changes and deflection forces.

25. A beam probe for an atomic force microscope, comprising:
   a cantilever having a probe tip, said cantilever being a spring element containing a flexible basic body having a detector zone, said cantilever having an electrical conductivity determined by a process selected from the group consisting of an electronic tunneling process, an ionization process and a hopping process, said detector zone being produced by a local energy application process, wherein:
      a substrate is provided;
      a number of precursor substances are fed in gaseous form to a deposition zone in a vicinity of said substrate;
      said precursor substances are selected from the group consisting of organic monomers, inorganic monomers, dielectric monomers, organometallic monomers, oligomers and polymers; and
      said precursor substances are excited energetically to effect a transformation resulting in transformation products depositing in solid and non-volatile form on said substrate.

26. A microscope, comprising:
   atomic force microscope including a beam probe;
   said beam probe having a cantilever with a probe tip, said cantilever being a spring element containing a flexible basic body having a detector zone, said cantilever having an electrical conductivity determined by a process selected from the group consisting of an electronic tunneling process, an ionization process and a hopping process, said detector zone being produced by a local energy application process, wherein:
      a substrate is provided;
      a number of precursor substances are fed in gaseous form to a deposition zone in a vicinity of said substrate;
      said precursor substances are selected from the group consisting of organic monomers, inorganic monomers, dielectric monomers, organometallic monomers, oligomers and polymers; and
      said precursor substances are excited energetically to effect a transformation resulting in transformation products depositing in solid and non-volatile form on said substrate.

27. The microscope according to claim 26, wherein said atomic force microscope includes an evaluation unit generating a data record characteristic of a topography of a measurement object on a basis of driving or measurement data of said beam probe, said evaluation unit taking account of characteristic values which are characteristic of said electrical conductivity of said cantilever for generating the data record.

28. A method for operating the microscope according to claim 26, which comprises the steps of:
   determining a deflection of the beam probe on a basis of a measurement value that is characteristic of an electrical conductivity of the beam probe.

* * * * *